(12) United States Patent
Jöhnßen et al.

(10) Patent No.: US 12,130,198 B2
(45) Date of Patent: Oct. 29, 2024

(54) ACOUSTIC ANALYSIS OF A STATE OF A MACHINE

(71) Applicant: SIEMENS AKTIENGESELLSCHAFT, Munich (DE)

(72) Inventors: Oliver Jöhnßen, Nuremberg (DE); Daniel Krüger, Roth (DE); Florian Kubo, Bavaria (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/622,704

(22) PCT Filed: Jun. 26, 2019

(86) PCT No.: PCT/EP2019/066939
§ 371 (c)(1),
(2) Date: Dec. 23, 2021

(87) PCT Pub. No.: WO2020/259819
PCT Pub. Date: Dec. 30, 2020

(65) Prior Publication Data
US 2022/0252481 A1     Aug. 11, 2022

(51) Int. Cl.
*G01M 13/00*     (2019.01)

(52) U.S. Cl.
CPC .................. *G01M 13/00* (2013.01)

(58) Field of Classification Search
None
See application file for complete search history.

(56) References Cited

U.S. PATENT DOCUMENTS

| | | | |
|---|---|---|---|
| 6,650,757 B1 | 11/2003 | Zhou et al. | |
| 10,564,031 B1* | 2/2020 | Stoia | G01H 3/08 |
| 2012/0163127 A1 | 6/2012 | Gerdes | |
| 2016/0238486 A1* | 8/2016 | Bense | G01N 29/4436 |
| 2017/0285626 A1 | 10/2017 | Lavi | |

(Continued)

FOREIGN PATENT DOCUMENTS

| | | |
|---|---|---|
| BE | 1018513 A3 | 2/2011 |
| CN | 102473338 A | 5/2012 |

(Continued)

OTHER PUBLICATIONS

International Preliminary Report on Patentability for International Patent Application PCT/EP2019/066939 mailed Sep. 27, 2021.

(Continued)

*Primary Examiner* — Lina Cordero
(74) *Attorney, Agent, or Firm* — Lempia Summerfield Katz LLC (57) ABSTRACT

In order to provide an acoustic analysis of a condition of a machine (8) having reduced computational complexity, a method for generating at least one reference signal (20) is provided. An individual acoustic signal is provided for each of at least two components (14, 15, 16) of the machine (8). A total acoustic signal which is to be expected is determined on the basis of the individual signals by means of a computing unit (13). The reference signal (20) is generated by means of the computing unit (13) in accordance with the total signal.

13 Claims, 2 Drawing Sheets

(56) References Cited

U.S. PATENT DOCUMENTS

2018/0017960 A1\* 1/2018 Shirata ............... G05B 23/0221
2018/0222498 A1 8/2018 Kelley
2019/0383701 A1\* 12/2019 Tezuka .................. G01D 21/00

FOREIGN PATENT DOCUMENTS

| CN | 105659064 A | 6/2016 |
| --- | --- | --- |
| CN | 106404388 A | 2/2017 |
| CN | 106662483 A | 5/2017 |
| DE | 10117114 A1 | 10/2002 |
| DE | 102018003222 A1 | 9/2018 |
| WO | 2017191313 A1 | 11/2017 |
| WO | WO-2017191362 A1 \* | 11/2017 |

OTHER PUBLICATIONS

International Search Report and the Written Opinion for International Patent Application PCT/EP2019/066939 mailed Mar. 18, 2020.

\* cited by examiner

ACOUSTIC ANALYSIS OF A STATE OF A MACHINE

This application is the National Stage of International Application No. PCT/EP2019/066939, filed Jun. 26, 2019. The entire contents of this documents are hereby incorporated herein by reference.

The present embodiments relate to a method for generating at least one reference signal for acoustic analysis of a state of a machine, a method for the acoustic analysis of the state of a machine, a corresponding analysis apparatus, and a computer program and a computer-readable storage medium.

Data analysis methods are becoming more widespread in industrial manufacturing, for example. The data analysis methods are aimed, for example, at predictive planning of maintenance work on machines in order to thus be able to minimize downtimes or losses in quality in the manufacturing process (e.g., "predictive maintenance").

In known methods, state data relating to a machine that is captured during the process is analyzed based on machine learning methods, and an attempt is made to derive significant trends. Large volumes of data are possibly required for this purpose in order to be able to make reliable predictions, and accordingly high computing capacities are thus required.

Further disadvantages of known methods are their sometimes large outlay on instrumentation, a restricted field of application or a lack of automation capability.

SUMMARY AND DECSCRIPTION

The scope of the present disclosure is defined solely by the appended claims and is not affected to any degree by the statements within this description.

The present embodiments may obviate one or more of the drawbacks or limitations in the related art. For example, an improved concept for the acoustic analysis of a state of a machine, which may be taken as a basis for reducing a volume of data to be processed and computing effort required for processing, is provided.

The improved concept is based on the idea of providing acoustic individual signals for individual components of the machine and generating a reference signal on the basis thereof.

A first independent aspect of the improved concept specifies a method for generating at least one reference signal for the acoustic analysis of a state of a machine. In this case, at least one acoustic individual signal is provided for each of at least two components of the machine. An expected acoustic overall signal is determined based on the individual signals by a computing unit. The reference signal is generated based on the overall signal by the computing unit.

The acoustic analysis of the machine may be understood as being, for example, an analysis of an operating noise of the machine. For example, the acoustic analysis includes the analysis of airborne sound waves that are generated by operation of the machine.

The computing unit may include one or more subunits or processor units that may be arranged in a spatially distributed manner, for example. For example, different method acts may be carried out by different subunits of the computing unit.

A component of the machine is, for example, a noise-emitting component of the machine. The component may have, for example, a motor, a gear apparatus, and/or other electrical elements or mechanically movable parts.

The provision of the acoustic individual signals includes, for example, the generation of the respective acoustic individual signals. In this case, the individual signals may be generated by capturing respective individual operating noises of the corresponding components using a sound transducer. Alternatively, complementarily or additionally, the generation of the individual signals may include a simulation (e.g., synthetic generation) of the acoustic individual signals.

Here and below, a sound transducer may be understood as being a sound sensor or a sound receiver (e.g., a sensor or receiving unit that is configured to convert airborne sound into electrical signals). For example, a sound transducer may be in the form of a microphone.

The sound transducer and the computing unit may be part of an analysis apparatus for the acoustic analysis of a state of a machine, for example.

According to at least one embodiment, the at least one associated acoustic individual signal is generated for each of the at least two components of the machine based on respective individual operating noises of the corresponding component (e.g., by a sound transducer).

In this case, the acoustic individual signals are generated, for example, based on the individual operating noises of the respective components in a reference or new state of the machine.

For example, an associated acoustic individual signal is provided or generated for each component of the machine and for each individual operating state of the component, where each individual operating state of a component is selected from a predefined set of individual operating states of the component.

The acoustic individual signals for a given component of the at least two components are, for example, independent of further components of the at least two components. This provides that further components of the at least two components do not contribute to the respective individual operating noise of the given component. In other words, the individual operating noises of the individual components are individually captured (e.g., while the further components of the at least two components are not operating or are acoustically isolated from the given component).

Here and below, the recording or pick-up of a noise (e.g., an operating or individual operating noise) may be the capture of the respective operating noise (e.g., using at least one sound transducer), and the subsequent storage of the signal generated thereby on a computer-readable storage medium (e.g., of the computing unit).

The individual signals may be provided, for example, as time-dependent signals or as signals in a frequency domain. Accordingly, the overall signal and/or the reference signal may each be generated as a time-dependent signal or as a signal in the frequency domain.

As a result of the fact that one or more individual associated acoustic individual signals are generated or provided for each of the at least two components and are taken as a basis for generating the overall signal and the reference signal, the individual components of the machine are individually taken into account independently of one another in order to generate the reference signal. As a result, it is possible to specifically take into account additional influences that contribute to the overall signal or the reference signal (e.g., environmental or interfering influences), for example, based on empirical data, simulation data, or based on theoretical or partially theoretical models.

As a result of the fact that the acoustic individual signals, which may be, for example, nominal signals or nominal noises of the individual components in the reference or new state of the machine, are known, it is only necessary, during the subsequent analysis of the state of the machine with reference to the reference signal, to capture an overall operating noise of the overall machine. For example, it is not necessary to also include the individual operating noises of the individual components during the analysis of the state of the machine since the influences of the individual components may be separated or isolated from the overall noise or overall operating noise of the machine. Accordingly, it is possible to record the operating noise in a manner relatively far away from the component for the purpose of analyzing the state of the machine, and recording of the noise close to the component is not necessary.

In comparison with other acoustic analysis methods, this results in the advantage that, according to the improved concept, a lower outlay on instrumentation is required (e.g., as far as the number and positioning of one or more sound transducers are concerned). For example, according to the improved concept, one sound transducer may suffice to record the operating noise of the machine for analyzing the state.

According to at least one embodiment, a respective first individual signal is recorded for each of the at least two components while the respective component is in the corresponding first individual operating state. The overall signal is determined based on the first individual signals by the computing unit. In this case, a combination (e.g., a predefined combination) of the first individual operating states of the at least two components (e.g., of all of the at least two components) defines a first operating state of the machine.

In other words, a first individual state is defined for each of the at least two components. The combination of all first individual states defines or forms the first operating state of the machine. For example, each possible operating state of the machine may be defined as a predefined combination of corresponding individual operating states of the at least two components of the machine.

An individual operating state of one of the at least two components may include, for example, one or more predefined operating parameters for the component and/or one or more environmental parameters for the component. Depending on the type of machine and component, the operating parameters may include, for example, a speed, a gear ratio, a feed speed, a load, or the like. The environmental parameters of the component may be, for example, a temperature or another environmental condition in an environment of the component.

The overall signal is determined, for example, based on the first individual signals by using those signals of the first individual signals that correspond to the corresponding individual operating states of the components, which together make up the first operating state of the machine, to generate the overall signal.

A model for generating the overall signal may be improved by adapting or varying the individual operating states or the operating state of the machine. This improves the accuracy of the reference signal and therefore the analysis of the state of the machine.

According to at least one embodiment, a second operating state of the machine is given by a defined combination of respective second individual operating states of the at least two components. A respective second individual signal is recorded for each of the at least two components while the respective component is in the corresponding second individual operating state. The overall signal is determined based on the second individual signals.

For examle, the second operating state of the machine differs from the first operating state of the machine. Accordingly, at least one of the second individual operating states of the at least two components differs from the corresponding first individual operating state of the respective component. It is possible, but not absolutely necessary, for all first individual operating states to differ from the corresponding second individual operating states.

According to at least one embodiment, the reference signal is the same as the overall signal.

According to at least one embodiment, the reference signal is generated, as described above, by determining a plurality of overall signals for different operating states of the machine and generating the reference signal based on the plurality of overall signals (e.g., by interpolation).

As a result, it is not necessary to determine a separate acoustic overall signal for each relevant operating state of the machine, which is possibly intended to be acoustically analyzed, by combining separately recorded individual signals. Rather, it suffices to select representative operating states of the machine as supporting points, and to generate the overall signal for the represenative operating states of the machine, as described. The reference signal for a representative operating state then corresponds to the respective overall signal, whereas the reference signal for an operating state not belonging to the representative operating states is generated based on overall signals of two or more representative operating states (e.g., by interpolation or combination).

According to at least one embodiment, the overall signal is generated based on the individual signals using a model.

In the simplest case, the model may involve adding the separate individual signals or adding the separate individual signals in a weighted manner, where the model includes the corresponding weighting factors. In more complex embodiments, the model may take into account, in addition to the individual signals, further influences (e.g., interfering noises or other interference), a geometrical structure of the machine, environmental conditions of the machine, and/or material-specific noise signatures of the machine in order to generate the overall signal.

According to at least one embodiment, the acoustic overall signal is determined based on a pose of one of the at least two components or based on two or more poses of two or more components of the at least two components using the computing unit.

Here and below, the pose of a component may be a combination of the position and orientation of the respective component in three-dimensional space. In this case, the position and orientation of the component may be defined with respect to one or more further components of the at least two components, with respect to a further component part of the machine or with respect to an object in the environment of the machine (e.g., a building floor, a building wall or a further machine).

The pose of the components may influence how the individual signals are to be weighted in order to form the expected overall signal. In addition, the influence of external influences may also depend on the poses. Taking the pose into account therefore achieves improved accuracy of the reference signal and ultimately of the analysis of the state of the machine.

According to at least one embodiment, the pose of one of the at least two components or the poses of all components of the at least two components is/are stored on a storage medium (e.g., of the computing unit). The computing unit may access the stored pose(s) in order to generate the overall signal.

According to at least one embodiment, the acoustic overall signal is determined based on a nominal environmental condition of the machine by the computing unit.

The nominal environmental condition is not, for example, a measured value, but rather, one or more model parameters for generating or determining the overall signal from the individual signals. Depending on the environmental condition, different individual signals may be reflected differently in the overall signal, for example, and/or the external influences on the overall signal may depend on the environmental condition.

The nominal environmental condition may be, for example, a temperature or humidity in the environment of the machine, a background or interfering noise, a size or nature of a room in which the machine is arranged, and/or the type and positioning or orientation of further objects or machines in the room.

The accuracy when generating the overall signal may be improved by virtue of the fact that the model for determining the overall signal takes into account the nominal environmental condition.

According to at least one embodiment, a current environmental condition of the machine is determined (e.g., measured) by a sensor apparatus (e.g., of the analysis apparatus). The reference signal is determined based on the current environmental condition (e.g, based on a difference value between the current environmental condition and the nominal environmental condition), by the computing unit.

The determination of the overall signal may be improved further by taking into account the actual environmental condition or the deviation of the actual environmental condition from the nominal environmental condition.

A further independent aspect of the improved concept specifies a method for the acoustic analysis of a state of a machine, where an acoustic operating signal is recorded (e.g., based on a current operating noise of the machine) during operation of the machine (e.g., by at least one sound transducer). A reference signal is provided based on a method for generating at least one reference signal for the acoustic analysis of a state of a machine according to the improved concept. The state of the machine is analyzed based on a deviation of the operating signal from the reference signal.

The reference signal is provided, for example, by generating the reference signal using a method for generating a reference signal according to the improved concept.

As stated above, a single sound transducer or a few sound transducers may suffice to record the operating signal, and a component-specific analysis of the state of the machine may nevertheless be carried out.

In comparison with analysis methods based on structure-borne sound measurements or thermographic measurements as well, outlay on instrumentation is reduced in a method according to the improved concept.

The state may also be analyzed in an automated manner using the improved concept since no manual investigations are necessary (e.g., investigations of wear debris in the machine oil), as is the case in ferrographic methods.

A further advantage of the improved concept is the universal applicability of the methods to virtually any desired machines having noise-emitting components.

As a result of the analysis according to the improved concept (e.g., based on a reference signal that was generated according to the improved concept), the volume of data that is to be examined for analysis is relatively low. Therefore, it is possible to dispense with complex data analysis methods, as are used in deep learning or machine learning, for example. This also results in a reduced computing effort for the analysis. Accordingly, it is not necessary, for example, to process the data to be analyzed in central backend or cloud servers. Rather, the analysis may be carried out in situ (e.g., "on premises").

According to at least one embodiment of the method for the acoustic analysis of a state of a machine according to the improved concept, a current operating state of the machine is determined by the computing unit. The reference signal is provided based on the current operating state using the computing unit.

In order to determine the current operating state, current operating parameters, for example, may be read from a control unit of the machine (e.g., from a control program for controlling the machine), by the computing unit. For this purpose, the computing unit may be coupled to the control unit of the machine, for example.

The current operating state of the machine is determined, for example, deterministically by the control program for the machine, (e.g., at any time). This makes it possible to predict the expected nominal acoustic behavior of the machine by appropriately providing the reference signal in a very limited timeframe.

In order to provide the reference signal based on the current operating state, an overall signal generated for a representative operating state may be selected as the reference signal, or the reference signal is generated based on overall signals of two or more representative operating states, as stated above. In this case, after determining the current operating state, the respective overall signals may be generated based on the model or may have already been generated and held in advance.

According to at least one embodiment, a difference signal is generated based on the deviation of the operating signal from the reference signal by the computing unit. The state is analyzed based on the difference signal by the computing unit.

This makes it possible to reduce the influence of noise as well as the evaluation complexity.

According to at least one embodiment, a frequency signal is generated based on the difference signal using the computing unit. The state is analyzed based on the frequency signal using the computing unit.

In order to generate the frequency signal, the difference signal, for example, is subjected to a Fourier transform.

In such embodiments, the difference signal and, for example, the reference signal and the operating signal are in the form of time-dependent signals.

Noise components may be hidden or removed, for example, in the frequency domain. This makes it possible to more clearly identify anomalous signal signatures or signal signatures that trace back to wear of the installation.

According to at least one embodiment, a check is carried out in order to determine whether there is an anomaly in the operation of the machine based on the analysis of the state by the computing unit.

The anomaly is, for example, a deviation of the current operating state of the machine or of current individual operating states of the components from expected states. The anomaly may trace back to a fault or defect, for example.

According to at least one embodiment, the computing unit is used to identify, based on the analysis, which of the at least two components exhibits the anomaly.

This is possible, for example, on account of the possible separation of the individual noise signatures of the components.

According to at least one embodiment, a degree of wear of the machine is determined based on the analysis of the state by the computing unit.

According to at least one embodiment, an individual degree of wear of one or more of the at least two components is determined based on the analysis of the state by the computing unit.

For example, it is possible to distinguish between a possible anomaly and wear phenomena based on characteristic signatures in the difference signal or in the frequency signal.

Further embodiments of the method for generating a reference signal according to the improved concept emerge directly from the different configurations of the method for analyzing a state of a machine according to the improved concept and vice versa.

A further independent aspect of the improved concept specifies an analysis apparatus for the acoustic analysis of a state of a machine, where the analysis apparatus has at least one sound transducer and a computing unit. The at least one sound transducer is configured to generate respective acoustic individual signals based on respective individual operating noises of at least two components of the machine. The computing unit is configured to determine an expected acoustic overall signal based on the individual signals. The computing unit is configured to generate a reference signal based on the overall signal.

For example, the at least one sound transducer may include exactly one sound transducer. In such embodiments, the sound transducer may be positioned, for example, at different locations in order to record the respective individual operating noises, and/or the sound transducer may be used to record the respective operating noises of the different components in succession.

Alternatively, the at least one sound transducer may include two or more sound transducers, where one or more of the sound transducers are used to record each of the individual operating noises.

The acoustic individual signals are stored, for example, on a storage medium (e.g., by the computing unit).

In other words, at least two acoustic individual signals are generated, where each of the at least two acoustic individual signals belongs to an associated component of the at least two components.

According to at least one embodiment, the analysis apparatus has a sensor apparatus that is configured to determine a current environmental condition of the machine. The computing unit is configured to determine the overall signal based on the current environmental condition.

According to at least one embodiment, the at least one sound transducer is configured to generate an acoustic operating signal based on an operating noise of the machine. The computing unit is configured to analyze the state based on a deviation of the operating signal from the reference signal.

The operating noise of the machine is, for example, an overall operating noise of the machine (e.g., an operating noise that is generated by a plurality of the at least two components together).

Further embodiments of the analysis apparatus emerge directly from the described configurations of the different methods according to the improved concept and vice versa in each case. For example, an analysis apparatus according to the improved concept may be configured or programmed to carry out a method according to the improved concept, or the analysis apparatus carries out a method according to the improved concept.

A further independent aspect of the improved concept specifies a computer program having instructions. If the computer program is executed by a computer system (e.g., by an analysis apparatus according to the improved concept, such as a computing unit of the analysis apparatus), the instructions cause the computer system (e.g., the analysis apparatus, such as the computing unit) to carry out a method for generating at least one reference signal for the acoustic analysis of a state of a machine according to the improved concept.

A further independent aspect of the improved concept specifies a further computer program having further instructions. If the further computer program is executed by an analysis apparatus according to the improved concept (e.g., by a computing unit of the analysis apparatus), the further instructions cause the analysis apparatus (e.g., the computing unit) to carry out a method for the acoustic analysis of a state of a machine according to the improved concept.

A further independent aspect of the improved concept specifies a computer-readable storage medium (e.g., a non-transitory computer-readable storage medium) on which a computer program and/or a further computer program according to the improved concept is/are stored.

The features and combinations of features mentioned in the description above and the features and combinations of features mentioned in the description of the figures below and/or shown in the figures alone may be used not only in the respectively stated combination, but also in other combinations, without departing from the scope of the invention. Embodiments and combinations of features that do not have all of the features of an originally formulated independent claim and/or go beyond or differ from the combinations of features stated in the dependency references of the claims may also be considered to have been disclosed.

The invention is explained in more detail below based on specific example embodiments and associated schematic drawings. In the figures, same or functionally same elements may be provided with the same reference signs. The description of same or functionally same elements is possibly not necessarily repeated with regard to different figures.

DETAILED DESCRIPTION

Figure 1:
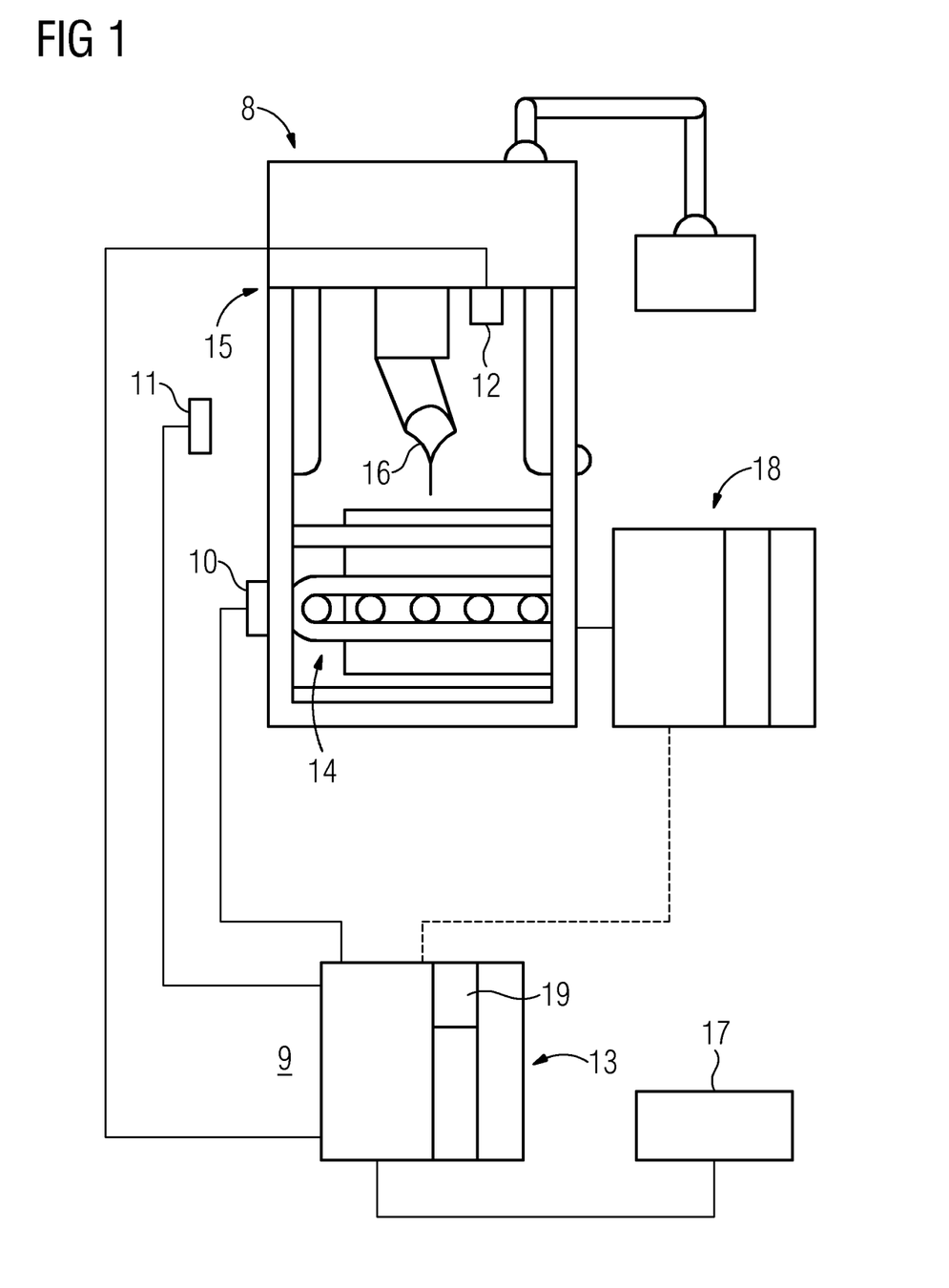
FIG. 1 shows a schematic illustration of an exemplary embodiment of an analysis apparatus according to the improved concept.

FIG. 1 illustrates one embodiment of a machine 8 that may be in the form of an industrial robot or a machine for the subtractive or additive manufacturing of component parts.

The machine 8 has, for example, a plurality of components (e.g., three components 14, 15, 16 in the schematic example in FIG. 1). The components 14, 15, 16 may have, for example, one or more corresponding motors or other noise-emitting component parts. In this case, a noise-emitting component part is referred to as such, for example, when the noise-emitting component produces noises during operation of the machine 8 (e.g., a specific operating state of the machine 8).

The machine 8 also has a control unit 18 that is coupled to at least one of the components 14, 15, 16 in order to control the at least one component 14, 15, 16, inter alia.

FIG. 1 also shows a schematic illustration of an exemplary embodiment of an analysis apparatus 9 for the acoustic analysis of a state of the machine 8.

The analysis apparatus 9 has a computing unit 13 that is in the form of a computer system having one or more processor units, for example. The computing unit 13 is coupled to the control unit 18, for example. The analysis apparatus 9 also has at least one sound transducer (e.g., three microphones 10, 11, 12 in the non-restrictive example in FIG. 1). A first microphone 10 may be arranged in this case in an environment of a first component 14, a second microphone 11 may be arranged, for example, in an environment of a second component 15, and a third microphone 12 may be arranged, for example, in an environment of a third component 16.

The described arrangement of the microphones 10, 11, 12 may be provided, for example, for the purpose of carrying out a method for generating at least one reference signal according to the improved concept, as shown. For example, the described arrangement of the microphones 10, 11, 12 may serve to record respective acoustic individual signals of the components 14, 15, 16 in order to generate the reference signal.

After the acoustic individual signals have been recorded, one or more or all of the microphones 10, 11, 12 may be arranged differently (e.g., in order to record an operating noise of the machine 8, such as an overall operating noise of the machine 8, in further acts of a method for the acoustic analysis according to the improved concept). All microphones 10, 11, 12 may be used for this purpose in different embodiments. In alternative embodiments, not all microphones 10, 11, 12 are used; for example, only one of the microphones 10, 11, 12 is used to record the operating noise of the machine 8.

The analysis apparatus 9 optionally has a sensor apparatus 17 that is connected or coupled to the computing unit 13 (e.g., in order to determine a current environmental condition, such as an ambient temperature, of the machine 8).

The computing unit 13 optionally has a computer-readable storage medium 19 (e.g., according to the improved concept), or the computing unit 13 is coupled to such a computer-readable storage medium 19.

The computing unit 13 may execute, for example, a computer program according to the improved concept that is stored on the computer-readable storage medium 19 in order to cause the analysis apparatus 9 to carry out a method according to the improved concept.

The method of operation of the analysis apparatus 9 in FIG. 1 is explained below with reference to an exemplary embodiment of a method for the acoustic analysis of a state of a machine according to the improved concept (e.g., with reference to FIG. 2 and FIG. 3). The described method acts 1-7 may not be carried out in this case in the order suggested by the numbering.

Figure 2:
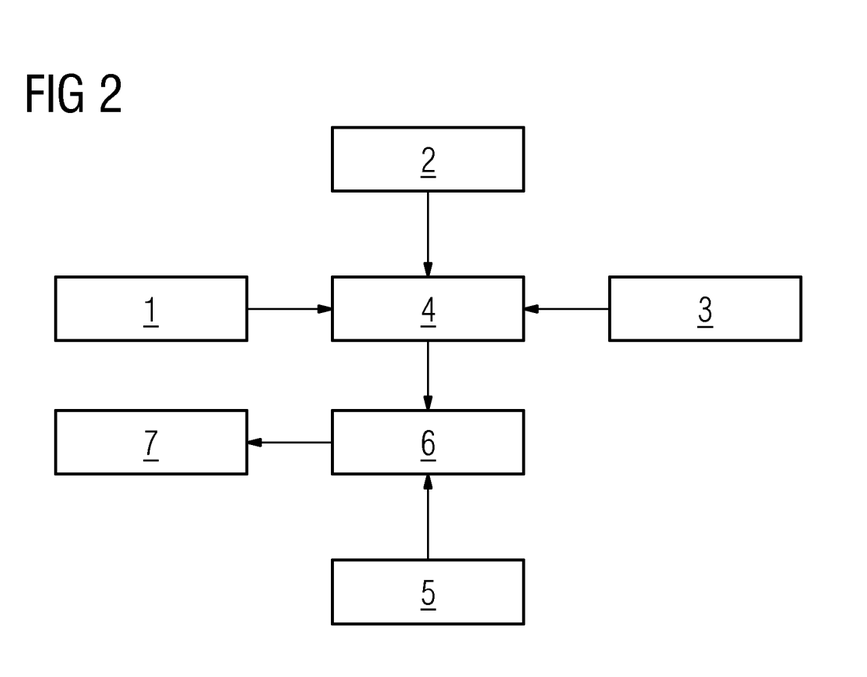
FIG. 2 shows a flowchart of an exemplary embodiment of a method according to the improved concept, in particular of a method for analyzing a state of a machine according to the improved concept.

FIG. 2 shows a flowchart of an exemplary embodiment of a method for the acoustic analysis of a state of the machine 8 according to the improved concept.

In act 1 of the method, the acoustic individual signals of the individual components 14, 15, 16 are recorded by the corresponding microphones 10, 11, 12, for example. In this case, a respective individual signal of a particular component 14, 15, 16 is recorded in isolation from the other components, for example. If the individual signal for the first component 14 is recorded, for example, any operating noise of further components 15, 16 is shielded from the first microphone 10. If possible, individual components of the other components 15, 16 may also be deactivated while recording the individual signal of the first component 14. The individual signals are generated, for example, for different individual operating states of the components 14, 15, 16.

As an alternative to using dedicated microphones 10, 11, 12 for each of the components 14, 15, 16, the individual signals of all components 14, 15, 16 may also be recorded using fewer microphones, for example, using only one microphone (e.g., in succession).

In optional act 2 of the method, environmental conditions of the machine 8 are captured, for example, using the sensor apparatus 17. Alternatively or additionally, information relating to an arrangement and/or orientation (e.g., position and/or orientation) of the components 14, 15, 16 (e.g., with respect to one another) may be loaded in optional act 2 by the computing unit 13 (e.g., from the storage medium 19 or from the control unit 18).

In act 3 of the method, a current operating state of the machine 8 is determined. For this purpose, the computing unit 13 may access, for example, the control unit 18 (e.g., a control program that is executed by the control unit 18) in order to determine current operating parameters or state parameters of the machine 8.

In act 4, the information from acts 1 and 3 and optionally from act 2 is processed in order to provide a reference signal.

For example, the computing unit 13 determines, based on the current operating state of the machine 8, which of the individual signals are combined with one another and how, and are possibly combined with further information (e.g., the information from act 2 or other interfering influences or environmental influences) in order to generate the reference signal. Alternatively, various reference signals may also be generated in advance, and the computing unit 13 selects one of the reference signals based on the current operating state.

In act 5 of the method, an operating noise is captured during the current operating state of the machine 8 and is recorded as an operating signal by at least one of the microphones 10, 11, 12 or by a further microphone (not shown).

In act 6 of the method, the computing unit 13 generates a difference signal 22, for example, based on a deviation of the operating signal 21 from the reference signal.

The difference signal 22 may likewise be converted into a frequency signal, for example, in act 6 (e.g., using a Fourier transform of the difference signal 22).

In act 7, the computing unit 13 may analyze the difference signal 22 or the frequency signal, for example, in order to analyze the state of the machine 8.

For example, the computing unit 13 may determine, based on the difference or frequency signal, whether there is an anomaly in the operation of the machine 8 and possibly on account of which component 14, 15, 16 the anomaly occurs.

Alternatively or additionally, the computing unit 13 may infer a degree of wear of the machine 8 and/or a respective degree of wear of one or more of the components 14, 15, 16 based on the difference signal 22 or the frequency signal.

Figure 3:
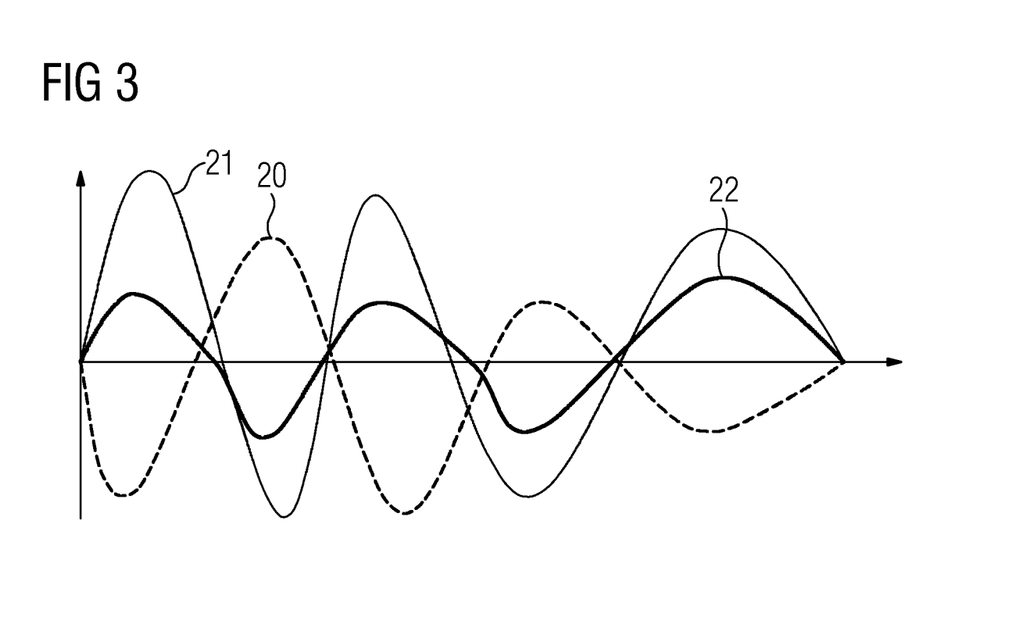
FIG. 3 shows signals in the context of a method according to FIG. 2.

FIG. 3 schematically illustrates the described signals. FIG. 3 shows respective signal amplitudes of the operating signal 21, an inverted reference signal 20, and the difference signal 22 as a function of the time. The difference signal results as the sum of the signals 21, 20.

The improved concept specifies a possible way of analyzing the state of a machine and a method for generating a corresponding reference signal. The improved concept manages without large volumes of data and accordingly without high computing powers and nevertheless allows predictive planning of maintenance work in order to minimize downtimes or losses in quality in a manufacturing process using the machine.

The improved concept specifies, for example, an acoustic method for the early detection of wear or anomalies in mechanical machine component parts. A deviation between an operating noise of the machine recorded during the process using one or more microphones and an expected nominal noise is used as a measure of the state of wear or the presence of the anomaly. In this case, the nominal noise is predicted as the reference signal. The modeling of the reference signal or the generation of the reference signal may be considered, for example, to be an indication of a digital twin of the machine to be analyzed. The prediction of the noise development of the machine with the aid of the digital twin uses a deterministic idea of the nominal noise for different operating states of the machine, with the result that the correlation with different levels of wear already provides more reliable statements than conventional approaches and with a smaller data base.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that may changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for generating at least one reference acoustic signal for an acoustic analysis of a state of a machine, the method comprising:
   recording, by at least one sound transducer, acoustic individual signals, the acoustic individual signals comprising at least one acoustic individual signal for each of at least two components of the machine;
   identifying, by a computing unit, a pose of a component of the at least two components from a storage device, the pose being a combination of a position and an orientation of the component in a three-dimensional space;
   determining, by the computing unit, an expected acoustic overall signal based on the acoustic individual signals and the pose of the component, the determining of the expected acoustic overall signal comprising weighting the at least one acoustic individual signal for the component based on the identified pose; and
   generating, by the computing unit, the at least one reference acoustic signal based on the expected acoustic overall signal,
   wherein an anomaly in operation of the machine is identifiable based on the at least one reference acoustic signal.

2. The method of claim 1, wherein a respective first individual signal of the acoustic individual signals is recorded for each of the at least two components while a respective component is in a corresponding first individual operating state,
   wherein a combination of first individual operating states of the at least two components defines an operating state of the machine, and
   wherein determining the expected acoustic overall signal comprises determining, by the computing unit, the expected acoustic overall signal based on first individual signals.

3. The method of claim 1, wherein the expected acoustic overall signal is determined, by the computing unit, based on a nominal environmental condition of the machine.

4. The method of claim 1, further comprising:
   determining, by a sensor apparatus, a current environmental condition of the machine; and
   determining, by the computing unit, the at least one reference acoustic signal based on the current environmental condition.

5. A method for acoustic analysis of a state of a machine, the method comprising:
   recording, by at least one sound transducer, an acoustic operating signal during operation of the machine;
   providing a reference acoustic signal, wherein providing the reference acoustic signal comprises generating the reference acoustic signal, wherein generating the reference acoustic signal comprises:
      recording, by one or more sound transducers, at least one acoustic individual signal for each of at least two components of the machine;
      identifying, by a computing unit, a pose of a component of the at least two components from a storage device, the pose being a combination of a position and an orientation of the component in a three-dimensional space;
      determining, by the computing unit, an expected acoustic overall signal based on the at least one acoustic individual signal for each of the at least two components of the machine and the pose of the component, the determining of the expected acoustic overall signal comprising weighting the at least one acoustic individual signal for the component based on the identified pose; and
      generating, by the computing unit, the reference acoustic signal based on the expected acoustic overall signal;
   analyzing the state of the machine based on a deviation of the acoustic operating signal from the reference acoustic signal; and
   identifying, by the computing unit, an anomaly in the operation of the machine based on the analyzing.

6. The method of claim 5, further comprising:
   determining, by the computing unit, a current operating state of the machine; and
   providing the reference acoustic signal based on the current operating state.

7. The method of claim 5, further comprising:
   generating, by the computing unit, a difference signal based on the deviation of the acoustic operating signal from the reference acoustic signal; and
   analyzing, by the computing unit, the state of the machine based on the difference signal.

8. The method of claim 7, further comprising:
generating, by the computing unit, a frequency signal based on the difference signal; and
analyzing, by the computing unit, the state of the machine based on the frequency signal.

9. The method of claim 5, further comprising:
checking, by the computing unit, whether there is the anomaly in the operation of the machine based on the analysis of the state of the machine;
determining, by the computing unit, a degree of wear of the machine based on the analysis of the state of the machine; or
a combination thereof.

10. The method of claim 5, further comprising identifying, by the computing unit, which of the at least two components of the machine exhibits the anomaly based on the analyzing.

11. An analysis apparatus for acoustic analysis of a state of a machine, the analysis apparatus comprising:
at least one sound transducer configured to generate respective acoustic individual signals based on respective individual operating noises of at least two components of the machine;
a storage device configured to store data representing a pose of a component of the at least two components, the pose being a combination of a position and an orientation of the component in a three-dimensional space;
a sensor apparatus configured to determine a current environmental condition of the machine; and
a computing unit configured to:
identify the pose of the component from the storage device;
determine an expected acoustic overall signal based on the acoustic individual signals, the pose of the component, and the current environmental condition of the machine, the determination of the expected acoustic overall signal comprising a weight of at least one acoustic individual signal for the component based on the identified pose;
generate a reference acoustic signal based on the expected acoustic overall signal; and
identify an anomaly in operation of the machine based on the reference acoustic signal.

12. The analysis apparatus of claim 11, wherein the at least one sound transducer is configured to generate an acoustic operating signal based on an operating noise of the machine, and
wherein the computing unit is configured to analyze the state of the machine based on a deviation of the acoustic operating signal from the reference acoustic signal.

13. A non-transitory computer-readable storage medium storing instructions executable by one or more processors to generate at least one reference acoustic signal for an acoustic analysis of a state of a machine, the instructions comprising:
recording, by at least one sound transducer, at least one acoustic individual signal for each of at least two components of the machine;
identifying, by a computing unit, a pose of a component of the at least two components from a storage device, the pose being a combination of a position and an orientation of the component in a three-dimensional space;
determining, by the computing unit, an expected acoustic overall signal based on acoustic individual signals and the pose of the component, the determining of the expected acoustic overall signal comprising weighting the at least one acoustic individual signal for the component based on the identified pose; and
generating, by the computing unit, the at least one reference acoustic signal based on the expected acoustic overall signal,
wherein an anomaly in operation of the machine is identifiable based on the at least one reference acoustic signal.

* * * * *